US007657595B2

(12) United States Patent
Agarwalla et al.

(10) Patent No.: US 7,657,595 B2
(45) Date of Patent: Feb. 2, 2010

(54) METHOD AND SYSTEM FOR GENERATING AUXILIARY-SERVER CACHE IDENTIFIERS

(75) Inventors: Rajesh S. Agarwalla, Pittsburgh, PA (US); Madhu Chetuparambil, Morrisville, NC (US); Steven D. Ims, Apex, NC (US); Brian K. Martin, Cary, NC (US); Thomas F. McElroy, Morrisville, NC (US); Subbarao Meduri, Cary, NC (US); Daniel C. Shupp, Raleigh, NC (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 12/038,067

(22) Filed: Feb. 27, 2008

(65) Prior Publication Data

US 2008/0288583 A1  Nov. 20, 2008

Related U.S. Application Data

(63) Continuation of application No. 10/198,289, filed on Jul. 18, 2002, now Pat. No. 7,363,340.

(51) Int. Cl.
*G06F 15/16* (2006.01)
*G06F 15/173* (2006.01)
*G06F 15/00* (2006.01)

(52) U.S. Cl. .............. 709/203; 709/223; 709/246; 715/513

(58) Field of Classification Search .............. None
See application file for complete search history.

(56) References Cited

U.S. PATENT DOCUMENTS

| 6,249,844 B1 * | 6/2001 | Schloss et al. ............ 711/122 |
| 7,096,418 B1 * | 8/2006 | Singhal et al. ............ 715/205 |
| 2003/0004998 A1 * | 1/2003 | Datta ...................... 707/513 |
| 2004/0044731 A1 * | 3/2004 | Chen et al. .............. 709/203 |

* cited by examiner

*Primary Examiner*—Wen-Tai Lin
(74) *Attorney, Agent, or Firm*—Kunzler & McKenzie

(57) ABSTRACT

A method, system, and computer program product, by which portions of the session information that page-content is dependent upon are "pushed" to the client from the origin server in a way such that auxiliary servers, e.g. other application servers and edge-servers, have access to the session information and fragment dependancy data to generate auxiliary-server cache-IDs for the custom pages. This enables distribution of the load away from the origin server, allowing better application distribution and scalability through more effective caching.

24 Claims, 9 Drawing Sheets

METHOD AND SYSTEM FOR GENERATING AUXILIARY-SERVER CACHE IDENTIFIERS

CROSS-REFERENCE TO RELATED APPLICATIONS

This is a continuation of U.S. application Ser. No. 10/198,289 filed Jul. 18, 2002, the entire contents of which is hereby incorporated by reference.

BACKGROUND OF THE INVENTION

1. Field of the Invention

The present invention relates to the field of caching and, more particularly, to ESI-based edge server caching.

2. Description of the Related Art

As the Internet continues to evolve and as the World Wide Web ("the Web") becomes more congested, significant attention is being given to reducing the load on the Web and increasing the efficiency of Web operations. One area that has been the focus of extensive research and development activity is the field of caching. Caching is simply the local or auxiliary storage of previously viewed content so that a request to view this same content can be served to a client browser without having to re-request the same content from the application server that served it in the first instance (referred to herein as the "originating server" or "origin server"). Caching, among other things, saves the origin server the trouble of having to recreate the content multiple times.

FIG. 1 illustrates a typical prior art web architecture 100. Multiple user terminals 102, 104, and 106 operate browsing software over the internet or other network connection 108 to retrieve content (e.g., web pages) from a content source 110. Typically content source 110 comprises one or more application servers 112 coupled to one or more databases (not shown). In this type of system, all of the content is generated and delivered from content source 110, requiring expensive infrastructure and placing heavy operational loads on the application servers 112.

The "origin server" for a particular block of content is the application server 112 that serves the original request for that block of content. Since the origin server is the source of the content, it is considered to be at the center of the network, and the clients (i.e., user terminals 102-106) are considered to be located at the outer edge of the network. Thus, the closer a network device is to the client, the closer it is to the "edge of the network."

FIG. 2 illustrates a known improvement to the typical web architecture shown in FIG. 1. In FIG. 2, client servers 202, 204, and 206 still access the content source 210 via the internet/network 208. However, multiple auxiliary servers such as edge servers 220 are located closer to the outer edge of the network and act as intermediary servers that operate between the client servers and the content source. These "edge servers" were initially used to, among other things, cache web pages so that, if a request was made for a page that was already stored in one of the edge servers 220, the content could be immediately served back to the requesting client browser rather than having to traverse all the way to the content source 210 and tax the operational resources such as application servers 212 and databases 214.

"Whole-page caching" is a rudimentary form of caching in which an entire "page" of web content is cached upon retrieval from the originating server. Whole-page caching is effective for static web pages where the entire page is likely to remain unchanged for extended periods of time. Dynamic web pages, however, and their ability to create web content "on-the-fly" and/or customized web content depending upon the identity of the user, introduce significant caching challenges.

Edge Side Includes (ESI) is an emerging World Wide Web Consortium ("W3C") standard that defines an XML-based markup language used to assemble markup language fragments for clients, such as HTTP clients. A thorough explanation of ESI can be found in the W3C "ESI Language Specification 1.0" (August 2001) at http://www.w3.org/TR/esi-lang. ESI permits a web page to be partitioned into fragments and dynamically assembled at an edge server, thus allowing several performance and space optimizations, previously impossible, to be realized. As an example, many web sites provide an identical "sidebar" of content on each page of the website and different content in a main portion of each page. When whole-page caching is utilized, multiple copies of the same sidebar will exist in different cache entries, thus wasting cache space. When ESI is used to delineate the sidebar as a fragment, only one version of the sidebar need exist in the cache and this single sidebar can be incorporated into pages to create the complete web pages, using ESI's fragment assembly capabilities, at the edge server.

Another compelling use for ESI fragments is when an otherwise cacheable web page contains a small portion (or portions) that is either personalized for a particular user or class of users, or highly dynamic (e.g., weather maps). Even though the majority of the content on the page may be static content and thus be an excellent candidate for caching using whole page caching techniques, caching such pages as whole pages would not result in any advantage, since the cached pages would "expire" quickly. With ESI, the personalized portion of the page (or the highly dynamic portion, e.g., the weather map) is identified as an ESI fragment and the remaining portion of the page is now cacheable as a "template," also called a top-level fragment. The ESI runtime processor utilizes its fragment-assembly capability to generate the complete page at the edge server as a concatenation of a template and fragments cacheable at the edge and fragments that need to be fetched from the originating server due to their personalized or dynamic nature. This reduces the amount of page processing that occurs on the originating server to only those portions that need to be executed there (i.e., the personalized/dynamic content), and thus reduces the processing overhead of the originating server.

FIGS. 3-6 illustrate a simple example of a situation where ESI can be used to advantage. In this example, content is personalized for particular groups of users (e.g., new customers designated with "silver" status; low-volume repeat customers designated with "gold" status; and high-volume repeat customers designated with "platinum" status). FIG. 3 illustrates a fully assembled web page 300 having a static "sidebar content" field 302 and a "variable content" field 304 which, in FIG. 3, shows "silver content" fragment 306 inserted in field 304. It is understood that the sidebar content could also be a fragment and that the template could be simply a "blank" page into which multiple fragments can be inserted.

FIG. 4 illustrates the template without any fragment inserted therein. The page would be whole page cacheable but for the variable content field, which will change based on whether the person has silver, gold, or platinum status. In this situation, the variable content field 304 of the fully assembled webpage 300 can be designated for insertion of ESI fragments and cached at the edge server, and the personalized fragments are cached at the origin server. In prior art systems, the entire web page 300 is dynamically assembled with the template at the origin server for a particular user by fetching the appropriate silver, gold, or platinum fragment based on the user's status at the time of assembly. FIGS. 5 and 6 illustrate separate platinum and gold fragments, respectively. The designation of the content into fragments permits the reduction of space overhead and simplifies operations, since it is simpler to code and decompose code into reusable functions and pieces.

While it is clear that the user of ESI yields significant performance benefits, it always requires the addition of the ESI tags, in addition to other possible re-structuring necessities. If the web application is J2EE compliant, it is typically written as a series of JSPs that are aggregated using the well-known <jsp:include> mechanism. Using an application server program having dynamic caching capability, such as IBM's WebSphere, these "JSP includes" can be automatically converted to ESI includes, and the included JSPs can be made ready for delivery outside of the confines of a JSP: include statement for those JSPs identified as being edgeable (able to be moved to an edge of network server because it is not dependent upon back-end data or back-end transactional capabilities). However, problems may remain that prohibit the automatic restructuring of an existing J2EE-compliant application to leverage ESI. Specifically, when there are multiple versions of a fragment that are cacheable (such as the silver, gold, and platinum fragment versions discussed above), a method must be created to cache them separately, or they must not be cached at all. Under the prior art, this requires either breaking dynamic fragments into multiple static fragments with different names, or not caching them at the edge-server, requiring more hits to the origin server.

A primary reason for this inability to automatically restructure an existing J2EE-compliant application to take advantage of ESI is the use of web "sessions." The concept of sessions is well-known and is a useful abstraction, but it can also hinder the "edgification," i.e., the ability to modify the program to assemble and execute the page, away from and independent of the data at the origin server of many application pages. Using sessions a user logs-in, thereby initiating a new session. The originating server verifies the login, and when returning the next page to the user, also sends them a "set-cookie" header that includes a session ID linking the user's activity during the session (e.g., clickstream data) to user information stored on the originating server (e.g., address, demographics, etc.). The session information is then used for most of the customization of any page required, from personalizing advertisements to printing the user's name. The programming used for the session operation keeps all of the actual data on the originating server, and this raw data is not accessible to an edge-server. The client uses a session ID in the request, and all the session data is stored on the origin server, referenced by the session ID.

Thus, it would be desirable to have a method, system, and/or computer program product that would allow existing application pages, e.g., J2EE application pages, to be easily and automatically converted so that they can be accessible for caching at edge servers.

SUMMARY OF THE INVENTION

In accordance with the present invention, portions of the session information that page-content is dependent upon are "pushed" to the client from the origin server in a way such that auxiliary servers, e.g. other application servers and edge-servers, have access to the session information and fragment dependency data to generate auxiliary-server cache-IDs for the custom pages that match the auxiliary-server markup used by the origin server to include those pages. This enables distribution of the load away from the origin server, allowing better application distribution and scalability through more effective caching.

DETAILED DESCRIPTION OF THE PREFERRED EMBODIMENTS

In general, the present invention comprises three phases. In the first phase, portions of data in the session that need to be pushed out to the client are identified. In particular, these portions of data include fragment dependency data that the auxiliary-server fragments (e.g., ESI fragments) that will be served to the client will be dependent on. For example, if a site is to be enabled to "edgify" pages that depend on the birthdate, sex, and class of service of the user, session data corresponding to these characteristics is identified.

In the second phase, cookies are generated containing information contained in the identified data portions, and the cookies are pushed to the client as part of the initial logon or session creation. In the third phase, auxiliary-server include tags (e.g., ESI-include tags) are constructed that correspond to the cookie data pushed to the client in the second phase (which correspond to the data dependencies), and the pages are modified to contain the auxiliary-server include tags prior to pushing the fragments from the origin server to auxiliary servers (e.g., edge servers), where the content is cached and the pages are dynamically assembled. The phases are explained and described in more detail below.

Figure 1:
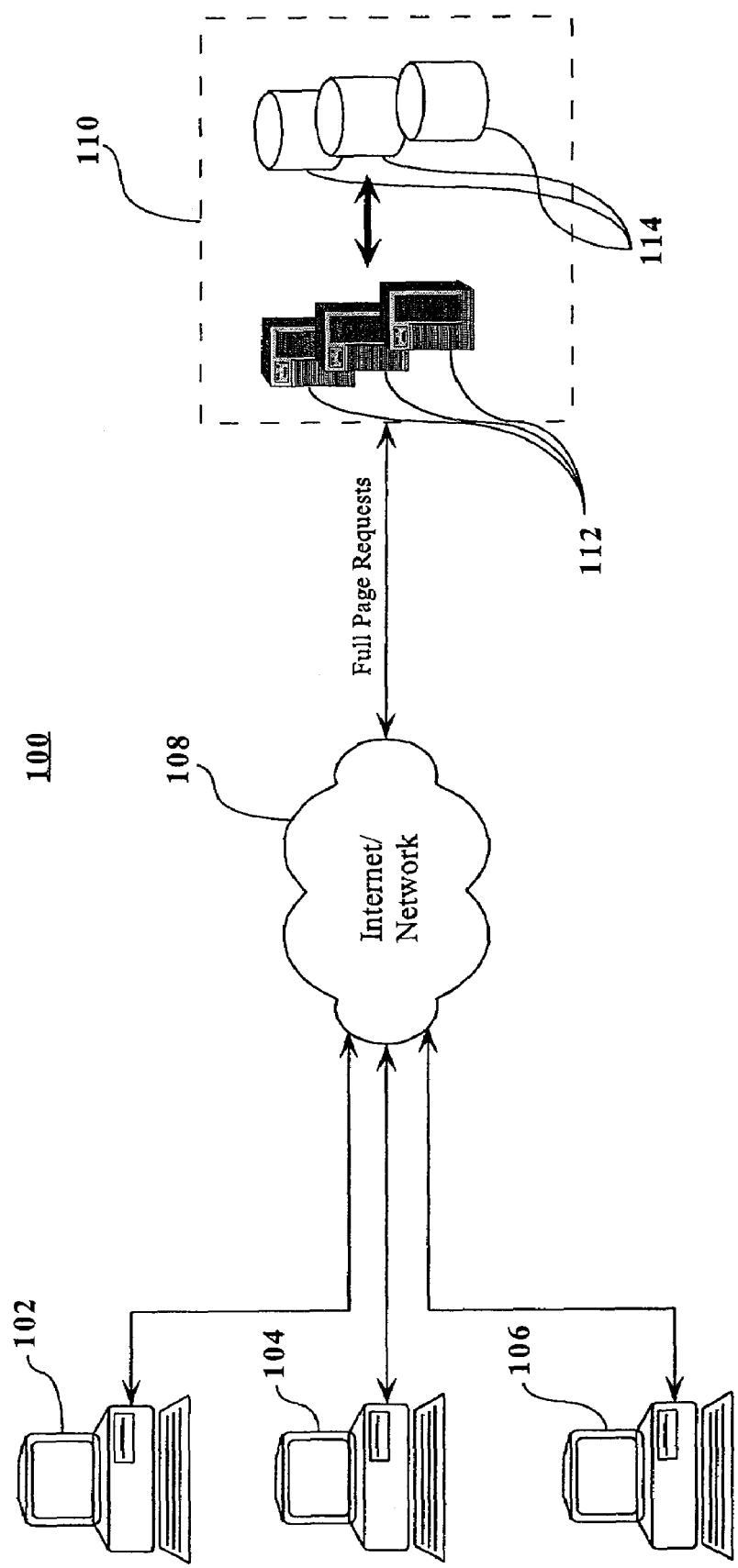
FIG. 1 illustrates a typical prior art web architecture.
Figure 2:
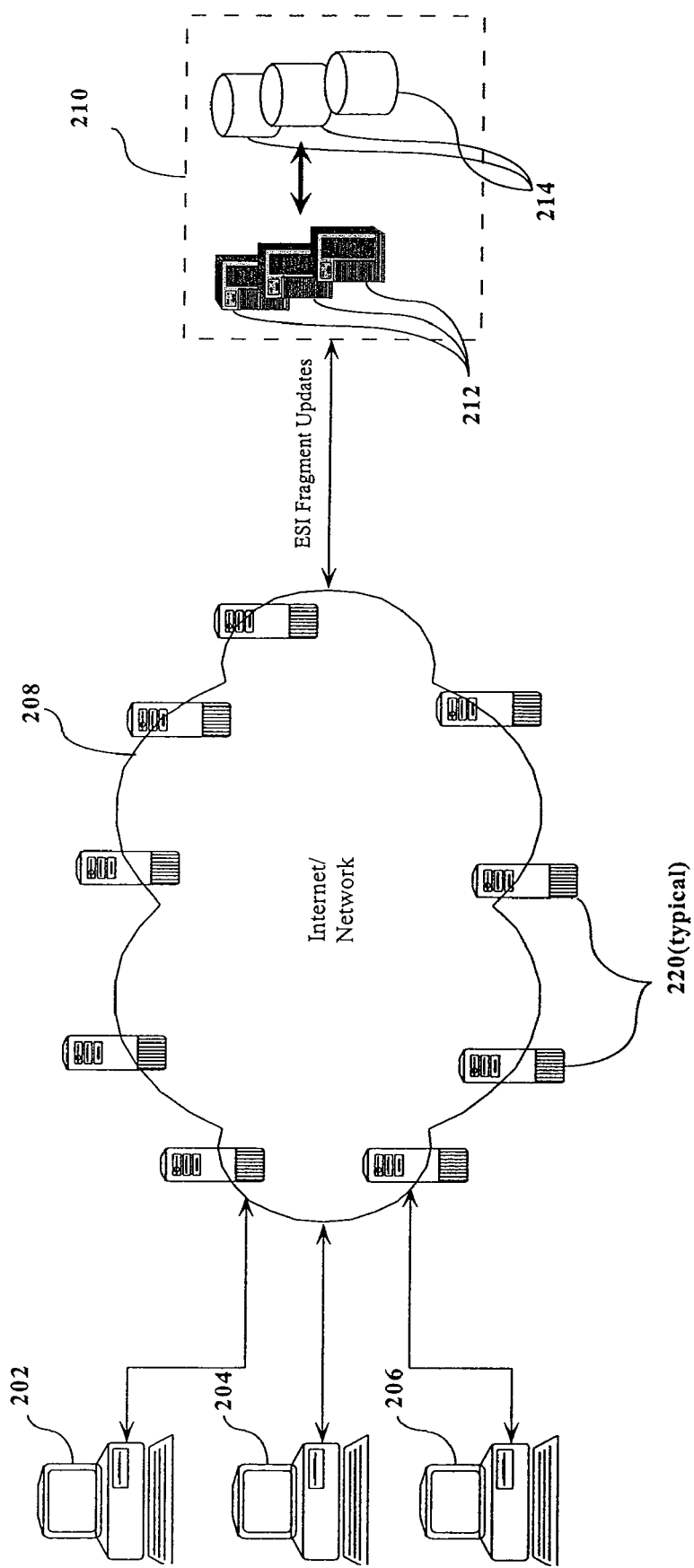
FIG. 2 illustrates a known improvement to the typical web architecture shown in FIG. 1.
Figure 3:
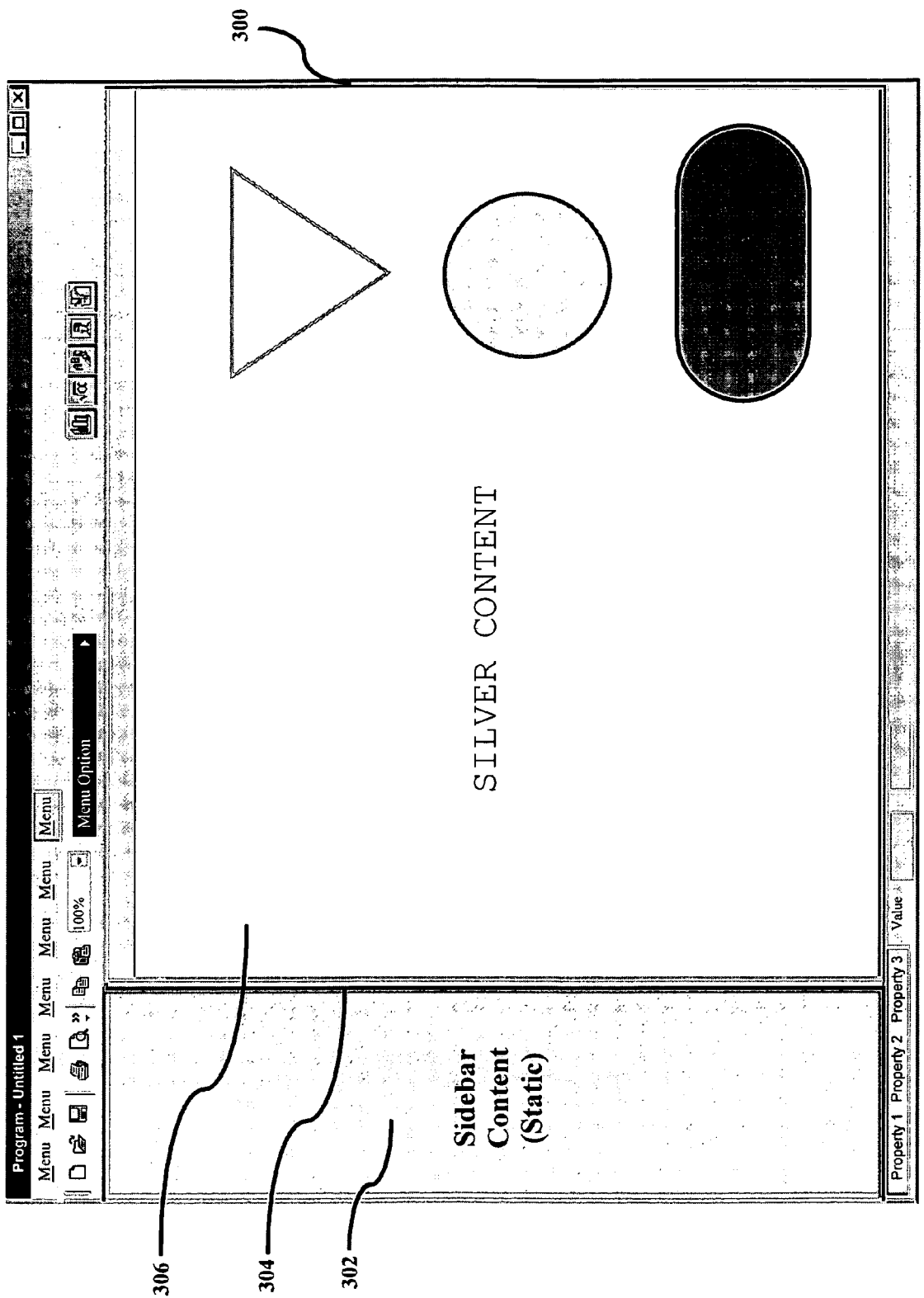
FIG. 3 illustrates a fully assembled prior art web page having a static "sidebar content" field.
Figure 4:
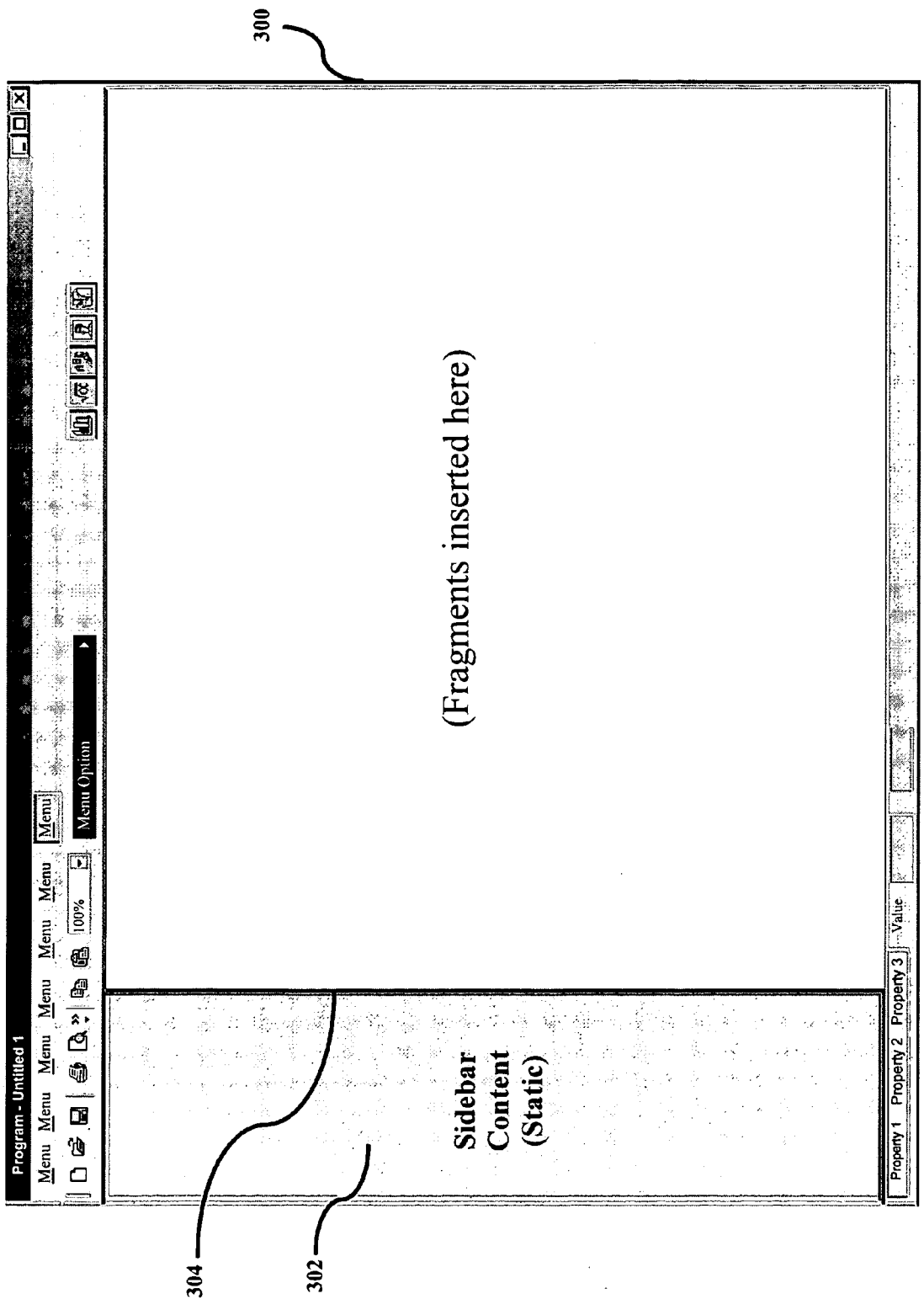
FIG. 4 illustrates the template used to create the web page of FIG. 3, without any fragment inserted therein.
Figure 5:
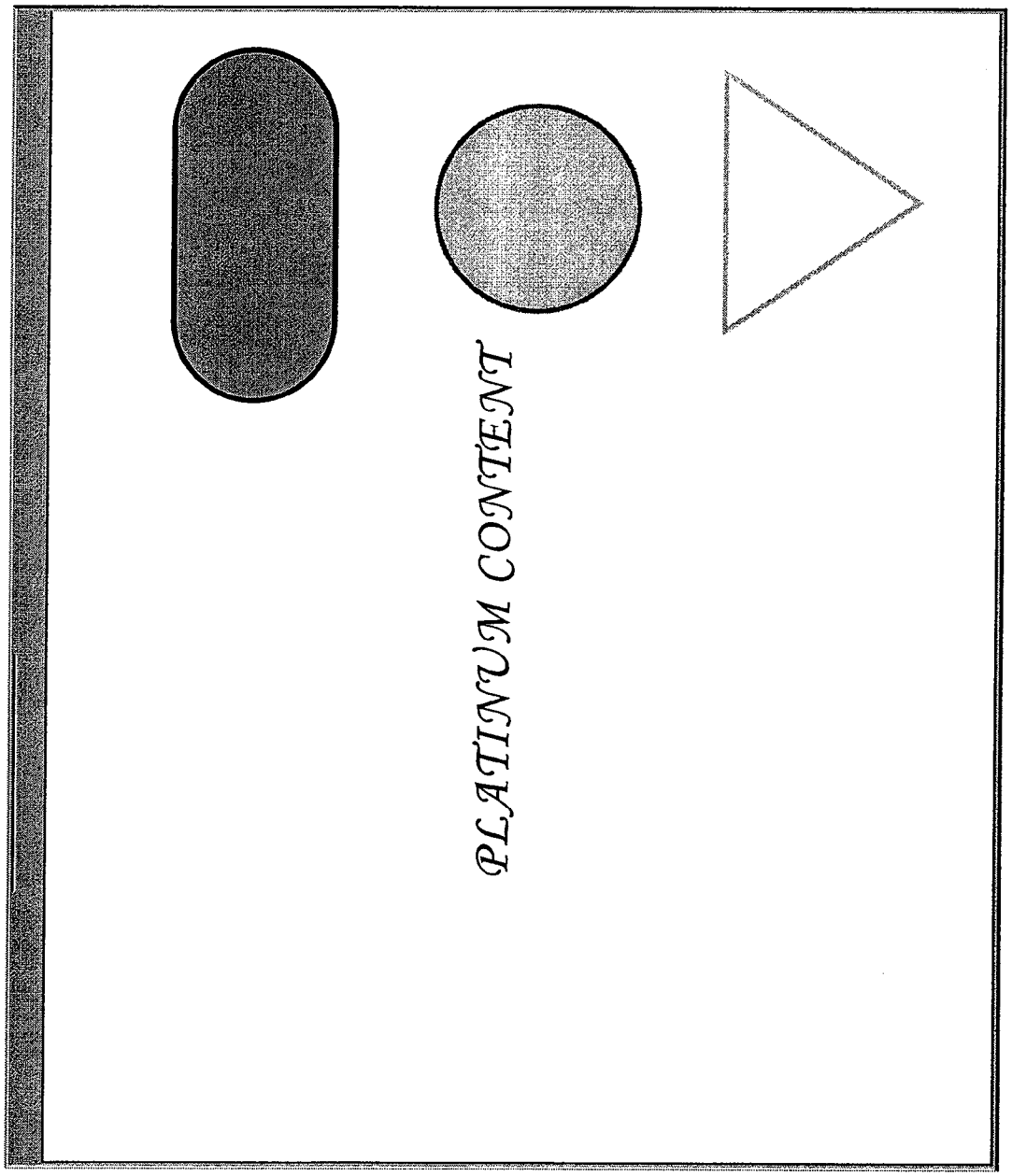
FIGS. 5 and 6 illustrate separate platinum and gold fragments, respectively.
Figure 6:
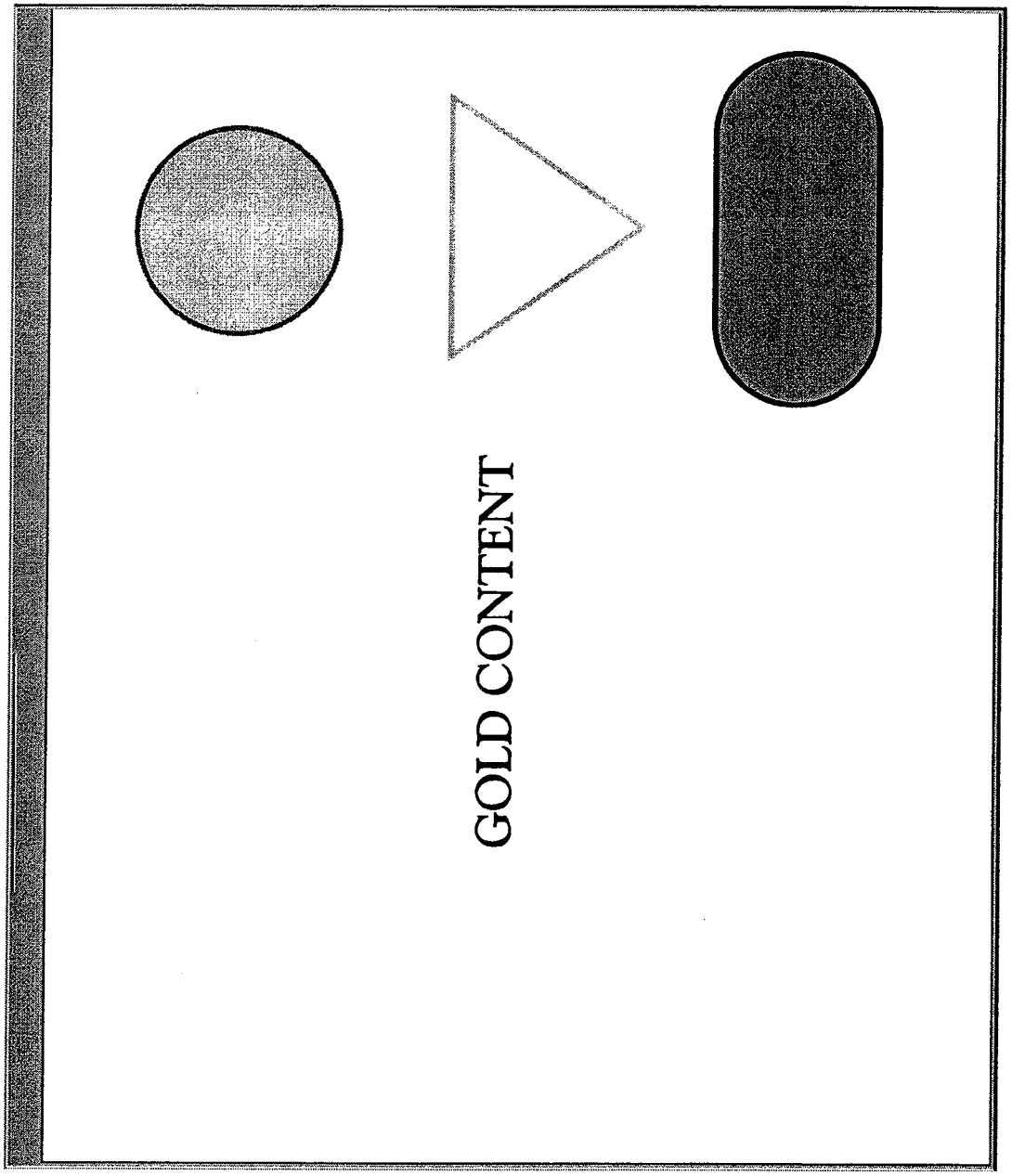
Figure 7:
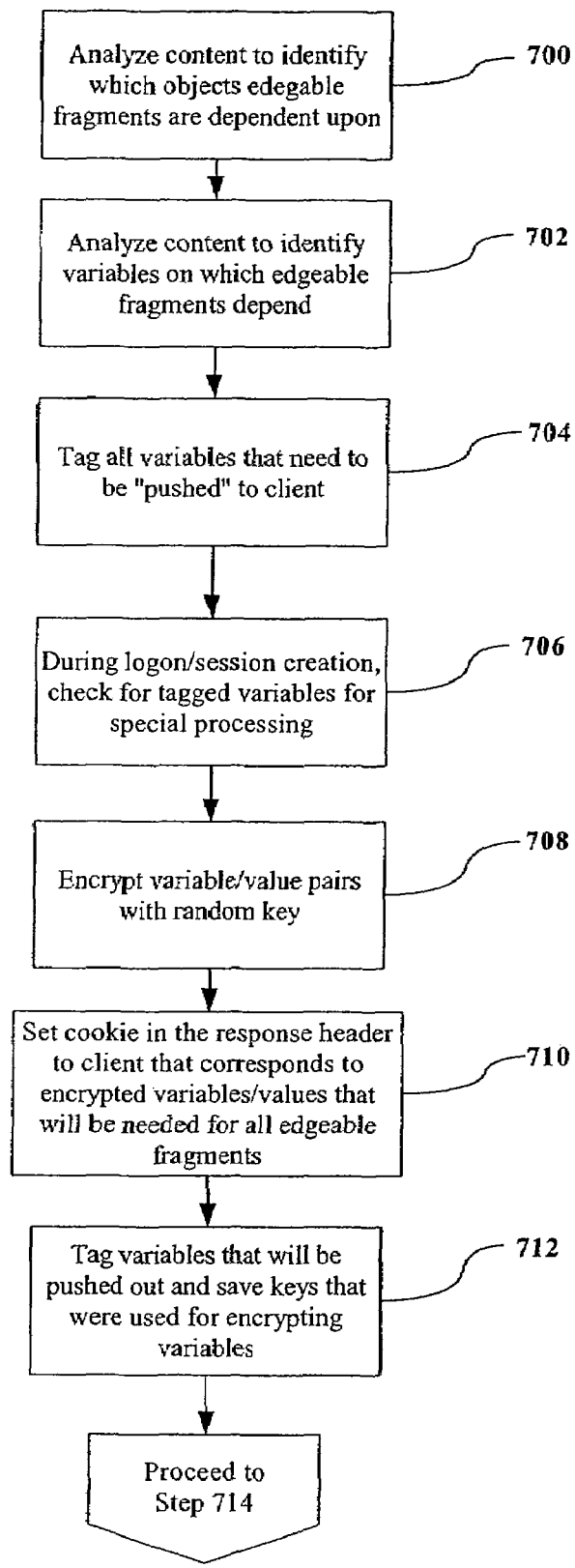
FIGS. 7-9 illustrate an example of the steps of the present invention in connection with edge servers using the ESI standard to edgify a J2EE web application.
Figure 8:
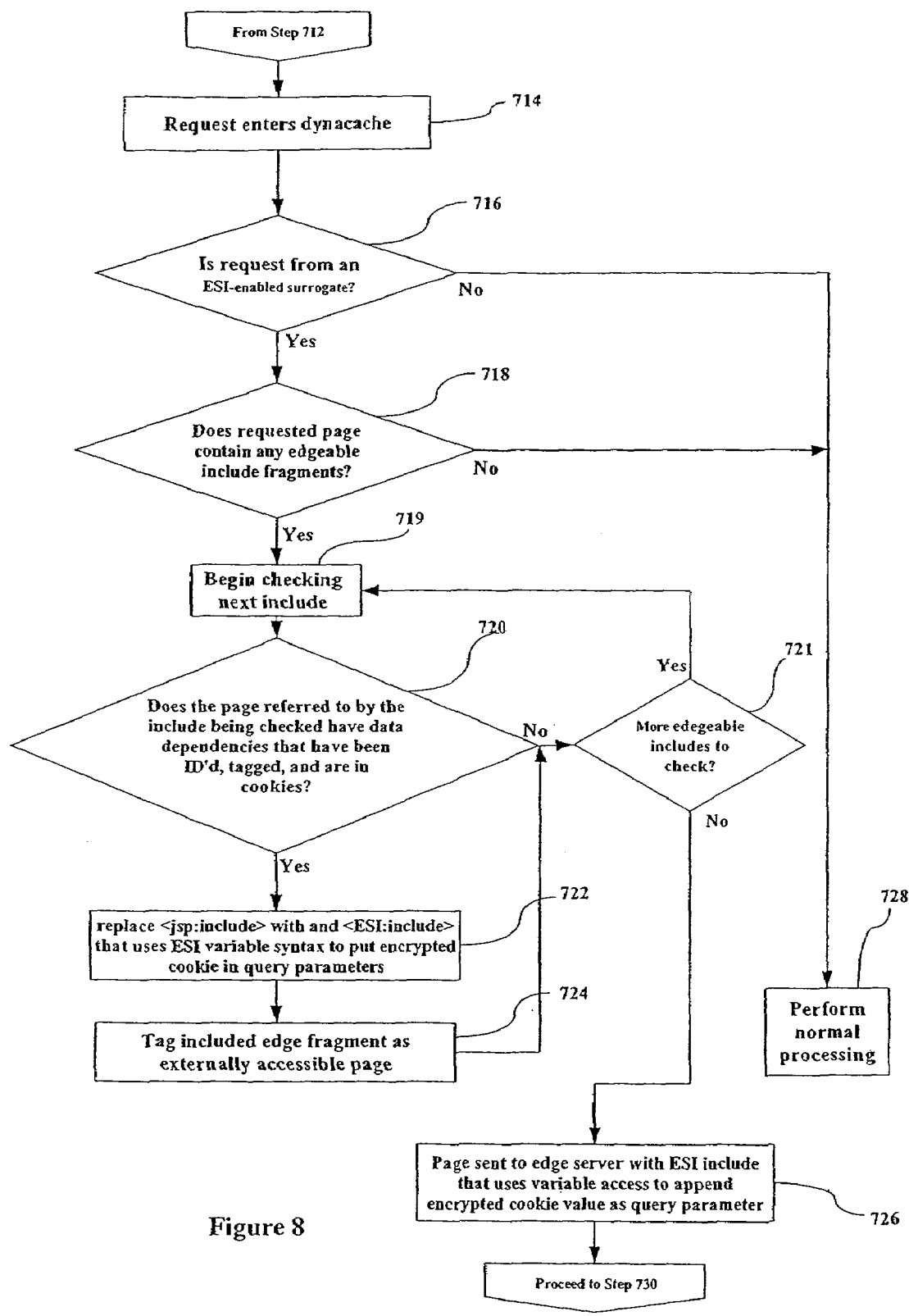
Figure 9:
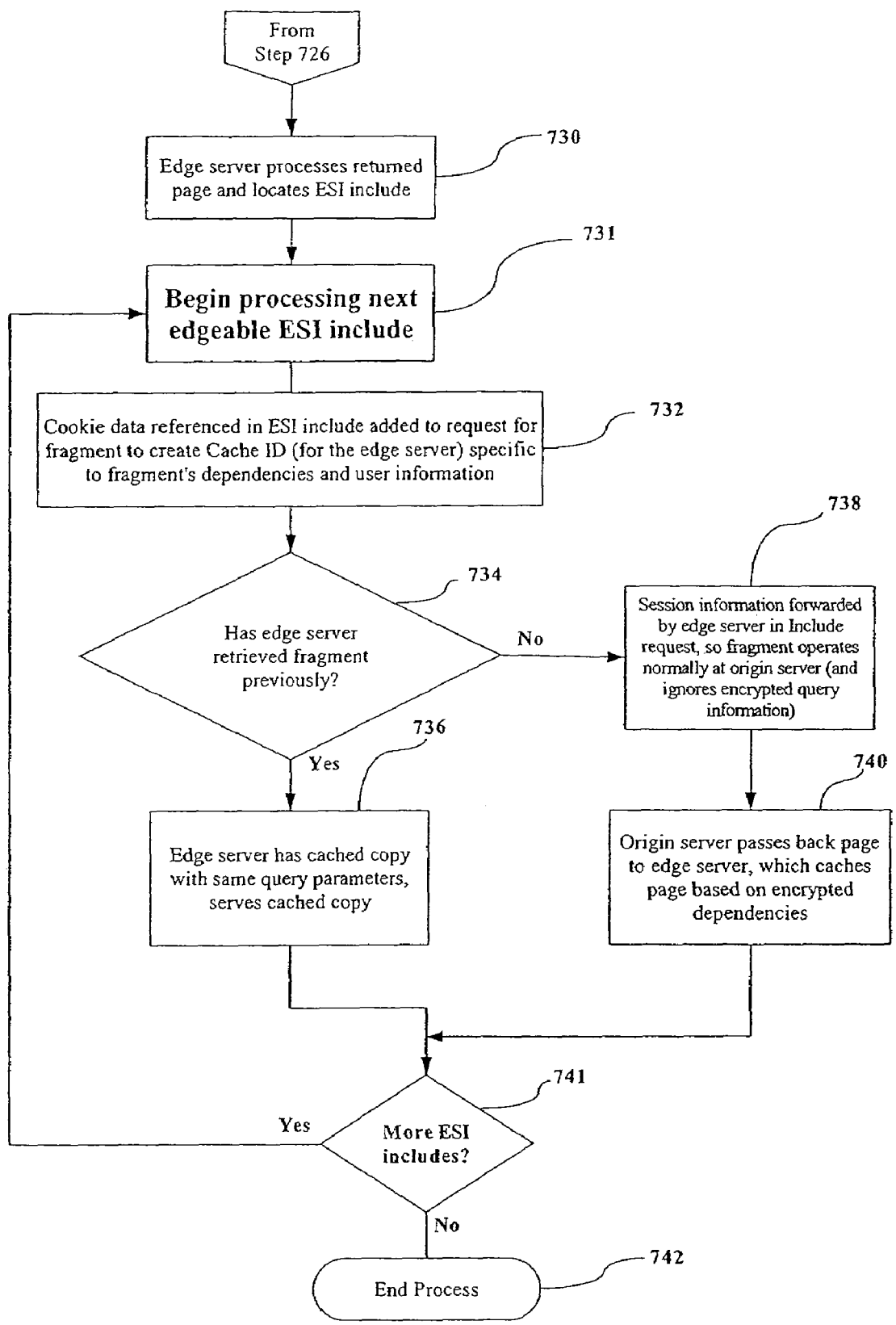

FIGS. 7-9 illustrate an example of the steps of the present invention in connection with edge servers using the ESI standard to edgify a J2EE web application. It is understood that the present invention is applicable to any server environment in which dynamically-generated content is initially served and assembled at an origin server and subsequently stored, assembled, and served from auxiliary servers.

Phase 1

Identifying portions of a J2EE web-application suitable for edgification requires in-depth analysis and understanding of the J2EE application. The use of dynamic application server caches, such as the "dynacache" of IBM's WebSphere program, provides a starting point by having the administrator manually identify which files are edgeable in the configuration files. Alternatively, the administrator determines what data is allowed out to the edge server, and then an automated process is used to determine which pages depend only on data that can be moved out to an edge-server. Referring to FIG. 7, this process is performed at step 700.

Identifying variables on which a page depends (i.e., fragment dependency data) is more difficult. Fortunately, dynacache and similar dynamic application server cache programs are designed so that the application developer/administrator identifies the variables a dynamic page is dependent upon to cache it accurately (although automated processes for making such identifications are contemplated as being within the scope of the present invention). Thus, all edgeable files and any fragments on which a file depends are also identified (step 702). When used for its original intended purpose, the dynamic application server cache program has to identify which variable edgeable fragments are dependent upon for caching at the origin; thus, in accordance with the present invention, this ability is used to advantage to identify the variables needed to cache at the edge.

Phase 2

Once the edgeable fragments and variables from the session information needed to enable edge caching and fragment assembly have been identified, in the second phase a mechanism to effect the proper assembly of documents is put in place. The first step of this mechanism is to tag all the variables in the J2EE applicant's session that will need to be pushed to the client (step 704). Then, during session creation or logon (or possibly later in the process), with the variables (i.e., information personal to the person logging in) having just been initialized/created, the server checks for identified variables (step 706) and sends the specific tagged variables (scrambled by the optional random key, if desired, step 708) to the client as cookies (step 710).

At step 712, the variable that each fragment depends upon is tagged and, along with any random keys, are stored at the origin server, for security reasons. If the random key stored with the variable is used to encrypt both the name and value of the cookie, it will not expose possibly personal and/or sensitive information over the network. If scrambling with a key is used, the key must be preserved so that future values of the same variable will be scrambled in the same way. For example, if two different male users log in, the scrambling of sex=male needs to be identical, so that the resultant cookies will be identical.

For example, assume that a portal homepage uses the above-described gold/silver/platinum classification, and from phase 1 it has been determined that an edgeable fragment called "personalizedAd.jsp", is a "jsp include" of a root-page "homepage.jsp." Further, assume that it has also been determined that "personalizedAd.jsp" is dependent on the "serviceclass" variable. When a user first logs on, their serviceclass variable is sent to them as a cookie, and masked, so that both the name of the variable and its value are non-obvious. For example, if the variable "serviceclass" is masked by replacing it with the variable "category", and if the classifications silver, gold, and platinum are replaced with the numbers 1, 2, and 3, respectively, then "category=1" in the cookie would correspond to "serviceclass=silver"; "category=2" would correspond to "serviceclass=gold"; and "category=3" would correspond to "serviceclass=platinum". This enables identification of the class of a user without placing easily ascertainable information about the user in the datastream.

Once the cookie is received, there is enough masked information on the client side to send to the edge server regarding all edgable, personalized pages to be served to the user.

Phase 3

In the final phase, it must be determined which requests are from an edge server, and when performing the jsp and servlet processing on the requested page, identify fragments that are edgeable. At step 714, a request from the client, via an edge server, enters the dynacache (or other dynamic application server cache program) and at step 716, it is determined if the request is from an ESI-enabled edge server (surrogate). If it is not from an ESI-enabled edge server, the process proceeds to step 728, and "normal" processing takes place. If it is determined that the request is from an ESI-enabled edge server, then the process proceeds to step 718.

At step 718, if it is determined that the requested page does not include any edgeable include fragments, the process proceeds to step 728 where the request is subjected to normal processing. If the requested page does contain edgeable include fragments, at step 719 the checking of the next such include begins. For each edgeable fragment identified, at step 720 it is determined if the requested page's fragment has data dependencies that have been identified, tagged and are contained in cookies. If the page being referred to by the include being checked does not have any such dependencies, at step 721 it is determined if there are more edgeable includes to check, and, if so, the process proceeds back to step 719, and if not, the process proceeds to step 726 (described below).

If at step 720 it is determined that the page referred to in the include being checked does include data dependencies that have been ID's, tagged, and are in cookies, the dependency information obtained in phase 1 and tagged and sent to the client in phase 2 is used to generate and insert an "ESI include" in place of a JSP:include in the requested page(s) that will utilize the dependency information to create a cache identifier for this fragment that matches the information sent to the client (step 722). In other words, when a user fetches the home page of a site (e.g., "homepage.jsp"), the request goes through an edge-server, which issues the request to the origin server. The origin server recognizes the existence of an ESI-enabled edge-server, and replaces a jsp:include tag with an ESI:include tag. Thus, the page that the client fetches is modified based on the fact that an ESI processor is present. The edge-server uses the information contained in the modified page to cache the fragment.

Continuing with the example, when the client sends a URL that directs the edge-server to request "homepage.jsp", the "jsp:include" tag "personalizedAd.jsp" is replaced with an "ESI:include" tag "personalizedAd.esi." This will enable the edge server to access "personalizedAd.jsp" externally, allowing the included URL to be cached based on the data it is specified to be dependent upon, by accessing the client-stored cookie through the ESI syntax.

At step 724, the fragment contained in the ESI:include inserted at step 722 is tagged as an externally accessible page. Once there are no more edgeable includes to check (as determined at step 721), then, at step 726, the page is sent to the edge server with the ESI:include that uses variable access to append the encrypted cookie value as a query parameter.

Referring now to FIG. 9, at step 730, the edge server processes the returned page and locates the ESI:include, and at step 731 the processing of the next edgeable ESI include begins. At step 732, the cookie data referenced in the ESI:include is added to the request for the fragment to create a cacheID for the edge server specific to the fragment's dependencies and the user information.

At step 734, it is determined if the edge server has retrieved the fragment identified in the request previously. If it has, at step 736, the edge server serves the cached copy to the client, and at step 741 it is determined if there are additional ESI includes to be processed. If there are, the process revets back to step 731; if not, the process terminates at step 742.

If, at step 734, a determination is made that the edge server has not retrieved the fragment previously, then at step 738 the session information is forwarded by the edge server in the include request, so the fragment operates normally at the origin server and ignores encrypted query information. Thus, when the ESI processor issues a request from the origin server to satisfy an include statement, it does so using all request headers from the request the client issued to the origin server. This results in the edge server mimicking the client enough that the origin server's operation need not be changed with respect to how it obtains data that the fragment depends upon. At step 740, the origin server passes back the page to the edge server, which caches the page based on the encrypted dependencies Thus, since the encrypted dependencies are in the request for the page as query parameters, the encrypted dependencies are also in the URL/URI. This information is what is used by standard edge-caching servers to index the cached pages. As before, if at step 741 it is determined that additional ESI includes exist for processing, then the process reverts to step 731, and if not, at step 742 the process ends.

To summarize, once dynacache (or other dynamic access content cache program) finds a JSP:include of an edgeable fragment and the data upon which it depends, an ESI tag is generated that utilizes the ESI variable syntax to access cookies in the client request header, and inserts them into the include tag as query parameters (masked with the key that was used to mask the cookie). This solution allows the use of cookies as a form of client-side data cache, accessible from the edge-server and stored invisibly on the client, using them in the ESI include tag as a way of creating a cache ID that is dependent upon specific data.

The following is provided to present an example of relevant HTML, JSP, and HTTP code illustrating the present invention. An initial request from a client browser being operated by "Bob" to an origin server might look as follows:
. . . <http headers> . . .
query: userid="bob", password="foobar"
get loginform.jsp An edgeserver in the path between the client browser and the origin server, edgeserv1.ibm.com, receives the request from the client and passes it on to the origin server in modified form:
. . . <http headers> . . .
Surrogate-capabilities: edgeserv1.ibm.com="ESI/1.0"
query: userid=bob&password=foobar
get loginform.jsp When the origin server receives the modified request, it recognizes that there is an ESI-capable surrogate (edgeserv1.ibm.com) upstream, and that it should prepare to use fragments by pushing information about the user sending the request (Bob) out to the client browser in cookies. The specific information to be pushed to the client is, as noted above, a function of the dynacache configuration. Thus, for example, the origin server might search its database(s) and determine that Bob is a male, and is currently a "gold member" under the "class of service" categories defined by the operator of the web site.

The object "class of service" is scrambled to be "moofbar" and the value "gold" is scrambled to be "ackmo"; the object "sex" is scrambled to be "umga" and the value "male" is scrambled to be "begfz". The returned page might look like:
. . . <http headers> . . .
Set-Cookie: moofbar=ackmo; umga=begfz;
Set-Cookie: storesession=3245se9sjd59d5d5f5;
. . .  . . .

when the page content might be a "welcome" page confirming that "bob" is a valid registered user and prompting him to input or click on a URL for viewing of site content.

Subsequently, when a page can be assembled at the edge server using fragments, e.g., "homepage.jsp", is requested by the client, the following is sent from the client to the origin server via the edge server:
. . . <http headers> . . .
get homepage.jsp
cookie: moofbar=ackmo; umba-begfz; storesession=3245se9sjd59d5d5f5;
query:storesession=3245se9sjd59d5d5f5

Assume for this example that, at the time of this request, the edge server does not have the requested page in cache. Thus, it submits to the origin server a request including the following:
. . . <http headers> . . .
get homepage.jsp
cookie: moofbar=ackmo; umga=begfz; storesession=3245se9sjd59d5d5f5;
Surrogate-Capabilities: edgeserv1.ibm.com="ESI/1.0"

When the origin server receives this request, it again recognizes the surrogate capabilities header and looks up the jsp:includes contained in homepage.jsp in the dynacache configuration information, to see which jsp:includes of homepage.jsp are edgeable, and which data objects the edgeable jsp:includes are dependent upon.

In this example, there is one jsp:include dependent upon the variable "sex" (<jsp:include page="/ads/sexistAd.jsp">), one dependent upon the variable "class of service"<jsp:include page="/ads/classistAd.jsp">), and one dependent upon both variables (<jsp:include page="/ads/sexistandclassistAd.jsp">). These three fragments are edgeable. The original page (before being processed by the JSP processor) will look as follows:
. . . <http headers> . . .
Pragma: no-cache;
Surrogate-Control: no-store;
. . .
<jsp:include page="/ads/sexistAd.jsp"/>
. . .
<jsp: include page="/ads/classistAd.jsp"/>
. . .
<jsp:include page="/ads/sexistandclassistAd.jsp"/>

The template returned to the edgeserver from the origin server would have ESI:includes with their scrambled dependencies and new URLs that can access the fragments remotely:
. . . <http headers> . . .
Surrogate-Control: content="ESI/1.0";
. . .
<esi:include src="http://www.foo.com/sexistAd.jsp?umga=$(HTTP_COOKIE{umga})"/>
. . .
<esi:include src="http://www.foo.com/classistAd.jsp?moofbar=$(HTTP_COOKIE{moofbar})"/>
. . .
<esi:include src="http://www.foo.com/sexistandclassistAd.jsp?umga=$(HTTP_COOKIE{umga})&moofbar=$(HTTP_COOKIE{moofbar})"/>

When the edgeserver receives this modified file, it will parse the headers and recognize the need to run the ESI processor. While running the ESI processor, it will come across the above three ESI:includes. It will construct a URL for the ESI:includes based on the cookie parameters. If that URL has been fetched before, it will have been cached, and accessible.

Thus, the above three ESI:includes will become HTTP requests to the origin server, and would have the following headers from the original request:
. . . <http headers> . . .
get sexistad.jsp
cookie: moofbar=ackmo; umga=begfz; storesession=3245se9sjd59d5d5f5;
Surrogate-Capabilities: edgeserv1.ibm.com="ESI/1.0"
Query:?umga=begfz;

The origin server uses the session information to process the personalization, ignoring the cookie value, since the actual code in the personalized webpage has not been changed. The pages that needed to be fetched are cached on the edge server in a URL reflecting the dependencies that the dynamic content contained. The page returned to the end user has no trace of this activity except for the lingering scrambled cookies, keeping secure any sensitive personal information.

The present invention allows pages with personalized content and service-level content to be cached on the edge server with an efficiency of storage and server resources that is much greater than traditional edge caching. Moreover, the present invention allows these benefits without requiring a severe overhaul or rewriting of existing J2EE applications, without exposing personal information in cleartext, without changing the mechanisms the edge-server uses to cache information, and without changing or introducing any new standards.

In situations where there is a small fragment of highly-personalized, uncacheable data embedded in a generic page, the present invention performs very well. It is particularly useful where there are a number of different fragments to be embedded, but where the fragments need to be cached and included in a way that takes into account user-information (e.g., silver, gold, platinum status). In this situation, the origin server is completely unloaded of the processing burden after the initial requests for the multiple fragments have been processed. Once the cache has all of this information, all subsequent read operations only touch the edge-server.

The above discussion focuses on a specific implementation of the present invention, but it is understood that the present invention is not so limited. The concept of having an intermediary (e.g., dynacache) modify web pages to distribute session data out to cookies and the implementation thereof described herein will also function with standards and devices other than ESI and an edge-server. For example, dynacache could send the cookie out, and modify the dependent pages by adding Javascript code (instead of ESI markup) to implement the data access on the client-side. This would make those pages edge cacheable, because the dynamic aspects would then be executed on the client instead of the server, with the data pushed down in cookies.

It would also be possible to use more complex markup language, such as a more powerful language that allows storing multiple session pieces in one cookie. The present invention is intended to cover any process where an intermediate server (such as the dynacache server) modifies pages as they are served to cache session data on the client with cookies, and insert code so that a device located away from the origin server has access to the cookies.

Another implementation of the present invention uses an extension to the ESI spec as an alternative mark-up that is used by the edge server to explicitly access the cookie(s) to generate a cacheID. In other words, the ESI standard can be modified/extended to create new tags that can be used to generate the cacheIDs. Thus, instead of embedding the cache-identifying information as part of the ESI-variable-syntax, the cache ID information is embedded in a custom tag that the surrogate uses to construct a cach ID. For instance, <cachID cookie:moofbar,umga> might indicate that the content is dependent on sex and class of service, and the edge server would interpret the tag, tack on the values of those two cookies to create a cacheID, and strip the tag out so that it will not get propagated to the client. This syntax is inexact and is given here for purpose of example only; it is used here merely to demonstrate that there are other ways of telling the edge-server to access the cookie information to construct a cacheID, and that these methods are included within the scope of the present invention.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a client or origin server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art. For example, the processing that dynacache performs to create the cookie and that the edge-server performs to access it could be modified, so that multiple pieces of session data could be bundled up into one cookie, allowing more data to be pushed out without filling up the client's "browser-quota" of cookies. Further, the dynacache could be configured to automatically determine what session variables an edgeable fragment is dependent upon and flag them automatically. It is intended that the present invention encompass such changes and modifications as fall within the scope of the appended claims.

We claim:

1. In a network environment in which a user, via a client, requests content from an origin server, a method for caching dynamic content at an auxiliary server, the method comprising the following computer-implemented steps:

identifying fragment dependency data in said origin server content, the fragment dependency data comprising one or more variables relating to a user that requests said origin server content using a client, a content fragment of the origin server content depending on the one or more variables;

serving said fragment dependency data to the client from the origin server;

generating a cache ID based on said fragment dependency data;

modifying the requested content to include said cache ID;

caching said modified content on said auxiliary server, said auxiliary server configured to dynamically assemble said modified content with the content fragment based on the fragment dependency data from the client and the cache ID; and caching the content fragment corresponding to the cache ID on said auxiliary server.

2. A method as set forth in claim 1, wherein said cache ID generating step comprises at least the step of:

generating auxiliary-server include-tags that reference said fragment dependency data.

3. A method as set forth in claim 2, wherein said modifying step comprises at least the step of:

modifying the requested content to replace existing include tags with said auxiliary-server include-tags.

4. A method as set forth in claim 3, wherein said caching step comprises at least the step of:

caching said modified content on said auxiliary server, identifiable by said cache ID.

5. A method as set forth in claim 4, wherein said identified fragment dependency data is encrypted prior to serving said fragment dependency data to the client.

6. A method as set forth in claim 5, wherein said dynamic content comprises web content.

7. A method as set forth in claim 6, wherein said auxiliary server comprises an edge server.

8. A method as set forth in claim 7, wherein said fragment dependency data served to the client comprises one or more cookies.

9. In a network environment in which a user, via a client, requests content from an origin server, a system for caching dynamic content at an auxiliary server, comprising:
   means for identifying fragment dependency data in said origin server content, the fragment dependency data comprising one or more variables relating to a user that requests said origin server content using a client, a content fragment of the origin server content depending on the one or more variables;
   means for serving said fragment dependency data to the client from the origin server;
   means for generating a cache ID based on said fragment dependency data;
   means for modifying the requested content to include said cache ID;
   means for caching said modified content on said auxiliary server, said auxiliary server configured to dynamically assemble said modified content with the content fragment based on the fragment dependency data from the client and the cache ID; and
   means for caching the content fragment corresponding to the cache ID on said auxiliary server.

10. A system as set forth in claim 9, wherein said cache ID generating means comprises at least:
    means for generating auxiliary-server include-tags that reference said fragment dependency data.

11. A system as set forth in claim 10 wherein said modifying means comprises at least:
    means for modifying the requested content to replace existing include tags with said auxiliary-server include-tags.

12. A system as set forth in claim 11, wherein said caching means comprises at least:
    means for caching said modified content on said auxiliary server, identifiable by said cache ID.

13. A system as set forth in claim 12, wherein said identified fragment dependency data is encrypted prior to serving said fragment dependency data to the client.

14. A system as set forth in claim 13, wherein said dynamic content comprises web content.

15. A system as set forth in claim 14, wherein said auxiliary server comprises an edge server.

16. A system as set forth in claim 15, wherein said fragment dependency data served to the client comprises one or more cookies.

17. In a network environment in which a user, via a client, requests content from an origin server, a computer program product for caching dynamic content at an auxiliary server, the computer program product comprising a computer-readable storage medium having computer-readable program code embodied in the medium, the computer-readable program code comprising:
   computer-readable program code that identifies fragment dependency data in said origin server content, the fragment dependency data comprising one or more variables relating to a user that requests said origin server content using a client, a content fragment of the origin server content depending on the one or more variables;
   computer-readable program code that serves said fragment dependency data to the client from the origin server;
   computer-readable program code that generates a cache ID based on said fragment dependency data;
   computer-readable program code that modifies the requested content to include said cache ID;
   computer-readable program code that caches said modified content on said auxiliary server, said auxiliary server configured to dynamically assemble said modified content with the content fragment based on the fragment dependency data from the client and the cache ID; and
   computer-readable program code that caches the content fragment corresponding to the cache ID on said auxiliary server.

18. A computer program product as set forth in claim 17, wherein said computer-readable program code that generates a cache ID comprises at least computer-generated program code that:
    generates auxiliary-server include-tags that reference said fragment dependency data.

19. A computer program product as set forth in claim 18, wherein said computer-readable program code that modified a cache ID comprises at least computer-generated program code that:
    modifies the requested content to replace existing include tags with said auxiliary-server include-tags.

20. A computer program product as set forth in claim 19, wherein said computer-readable program code that caches a cache ID comprises at least computer-generated program code that:
    caches said modified content on said auxiliary server, identifiable by said cache ID.

21. A computer program product as set forth in claim 20, wherein said identified fragment dependency data is encrypted prior to serving said fragment dependency data to the client.

22. A computer program product as set forth in claim 21, wherein said dynamic content comprises web content.

23. A computer program product as set forth in claim 22, wherein said auxiliary server comprises an edge server.

24. A computer program product as set forth in claim 23, wherein said fragment dependency data served to the client comprises one or more cookies.

* * * * *